United States Patent [19]

Mecklenborg

[11] Patent Number: 4,657,512
[45] Date of Patent: Apr. 14, 1987

[54] VISUAL SYSTEM WITH FILTER FOR A SIMULATOR

[75] Inventor: Richard A. Mecklenborg, Binghamton, N.Y.

[73] Assignee: The Singer Company, Binghamton, N.Y.

[21] Appl. No.: 740,614

[22] Filed: Jun. 8, 1985

[51] Int. Cl.[4] ............................................. G09B 9/08
[52] U.S. Cl. ......................................... 434/44; 434/30
[58] Field of Search .............................. 434/38, 44, 43; 350/132, 125

[56] References Cited

U.S. PATENT DOCUMENTS 3,557,470 1/1971 Emerick ................................. 434/44

FOREIGN PATENT DOCUMENTS 906042 9/1962 United Kingdom ................... 434/44

*Primary Examiner*—Richard C. Pinkham
*Assistant Examiner*—Stuart W. Rose
*Attorney, Agent, or Firm*—Douglas M. Clarkson; Barry L. Haley

[57] ABSTRACT

The disclosure described a vehicle simulator visual system for training two individuals, such as a pilot and a co-pilot seated side-by-side to view compound images that are projected on the same large curved screen. Structurally, the system comprises two projectors, each of which has a polarizer to polarize the individual light images in opposite directions in a circular manner. Two separate windshields are simulated and each one supports an analyzer that is polarized in the opposite circular direction from its projector. The polarization of each analyzer is such that one windshield will pass light that is polarized from one projector, and the other windshield will pass light that is polarized by the other polarizer.

5 Claims, 5 Drawing Figures

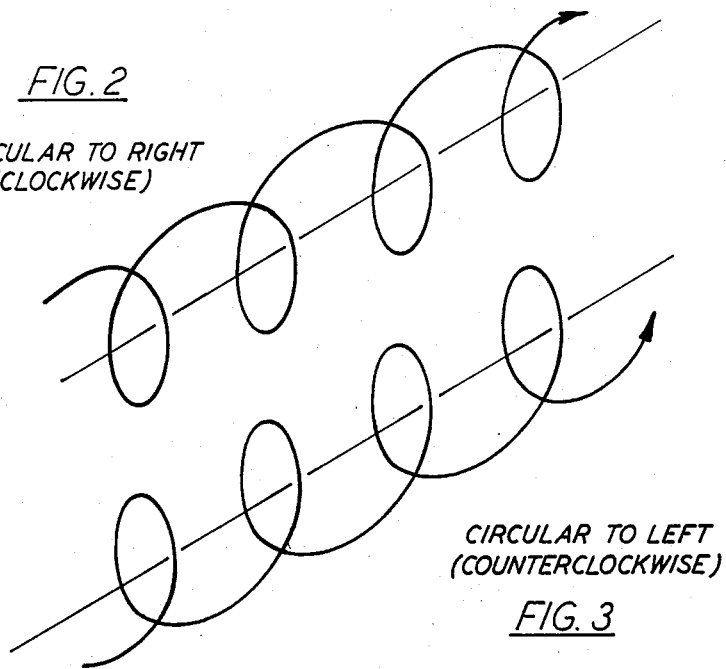
FIG. 2
CIRCULAR TO RIGHT
(CLOCKWISE)
CIRCULAR TO LEFT
(COUNTERCLOCKWISE)
FIG. 3
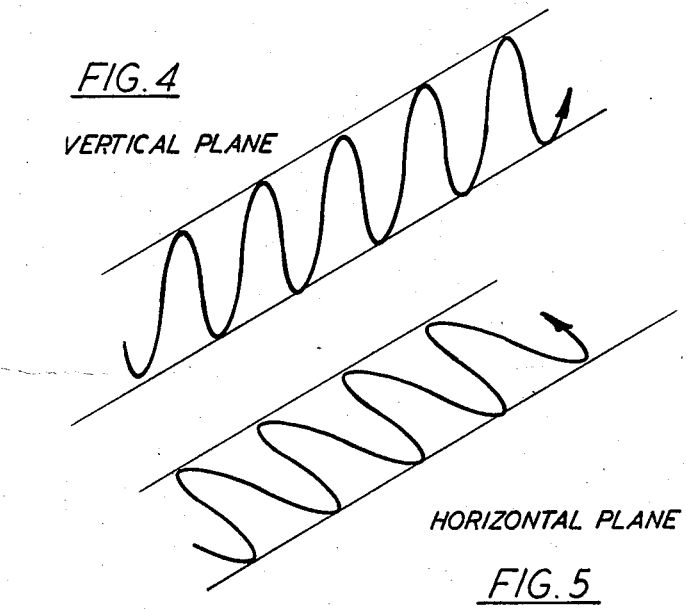
FIG. 4
VERTICAL PLANE
HORIZONTAL PLANE
FIG. 5

VISUAL SYSTEM WITH FILTER FOR A SIMULATOR

The U.S. Government has rights in this invention pursuant to Contract F33657-83-C-2186.

BACKGROUND OF THE INVENTION

This invention, generally, relates to vehicle simulation and, more particularly, to a new and improved visual system having a unique filter system for a simulator.

In today's high performance aircraft that have become more and more complex, there is a need for more extensive and specialized training. To obtain such training, a student pilot must either be provided with actual training and experience in the aircraft which he is to fly, or he must be provided with training in a simulator of such aircraft.

However, there are certain emergency procedures and maneuvers that simply cannot be accomplished by training in an actual aircraft because of the dangers of the actual real-life environment. This is especially true for maneuvers that involve emergency procedures, which makes training in a simulator of that aircraft particularly advantageous.

Additionally, with the increase in expense of flight fuel in recent years, the time required in training within such an actual aircraft makes that form of training excessively expensive, particularly when taking in consideration with the wear and tear on such an actual aircraft.

Consequently, aircraft simulators are being called upon to take on more and more of the aircraft training missions. For such training to be effective, the aircraft simulator must reproduce faithfully the environment that the trainee would face in an actual flight.

For those aircraft types in which a pilot and a co-pilot view the outside real world through relatively small windows, the visual part of the simulator is accomplished in the past through the use of a suitable Cathode Ray Tube (CRT) positioned at each window. However, a trend today is toward the use of larger screens on which can be projected by projectors images for viewing through the simulator windows, as in an actual aircraft.

In a typical visual system in a simulator today, the projector, the front projection screen, and the trainee are positioned at different locations. Such displacement of the trainee's eye position from the location of the projector produces a condition that is referred to as "off-axis viewing".

Such "off-axis viewing" causes an image location to be different, as perceived by different trainees in different physical locations, such as a pilot trainee and a co-pilot trainee in a simulator. A change in image brightness as a function of viewing angle has been recognized already and has been solved by an invention described and claimed in U.S. Pat. No. 4,354,738 by the present applicant and assigned to the same Assignee as the present invention.

The invention presented herein is for use in a flight simulator visual system for training a pilot and a co-pilot seated side-by-side, wherein the flight simulator uses compound image projectors such that the images viewed by the pilot and the co-pilot may be different, even though the compound images are projected onto the same screen. By providing compound images on a single screen that can discriminate whether a particular scene is viewed by the pilot or by the co-pilot simultaneously, realism can be heightened because of the different eye points that produces in the real world a different point of view and a different perspective that cannot be achieved in single projection systems.

INVENTION SUMMARY

It is an important object of the invention to produce a filter capable of operating effectively in a simulator environment that will permit distinguishing between two images when viewed from two different positions in the cockpit of a simulator.

Another object of the present invention is to provide an improved visual system utilizing a unique filter to permit distinguishing between different images.

Still another object of the invention is to provide a structure for a visual system in a flight simulator which overcomes the disadvantages of prior systems.

According to the invention, a visual system has a projector system, which can be a number of projectors, for projecting an image for viewing from a viewing position within a simulator. The projector system includes a means to polarize the image in a preselected circular manner, and this image is projected onto a screen that will preserve the circular nature of the polarized image. Finally, a suitable analyzer is positioned between the screen and the viewing position to filter out all but this circular polarized image.

Other objects and advantages, as well as a complete understanding of the invention, may be obtained from the following detailed description when considered in connection with the accompanying drawings.

THE DRAWINGS

FIG. 2 is a diagramatic illustration of a clockwise circular polarized beam of light.

FIG. 3 is a view similar to FIG. 2 but showing a beam of light circularly polarized counter-clockwise.

FIG. 4 is a view of a diagramatic illustration of a linearly polarized beam of light in the vertical plane.

FIG. 5 is a view similar to FIG. 4 but with the beam of light polarized in a horizontal plane.

DETAILED DESCRIPTION

Figure 1:
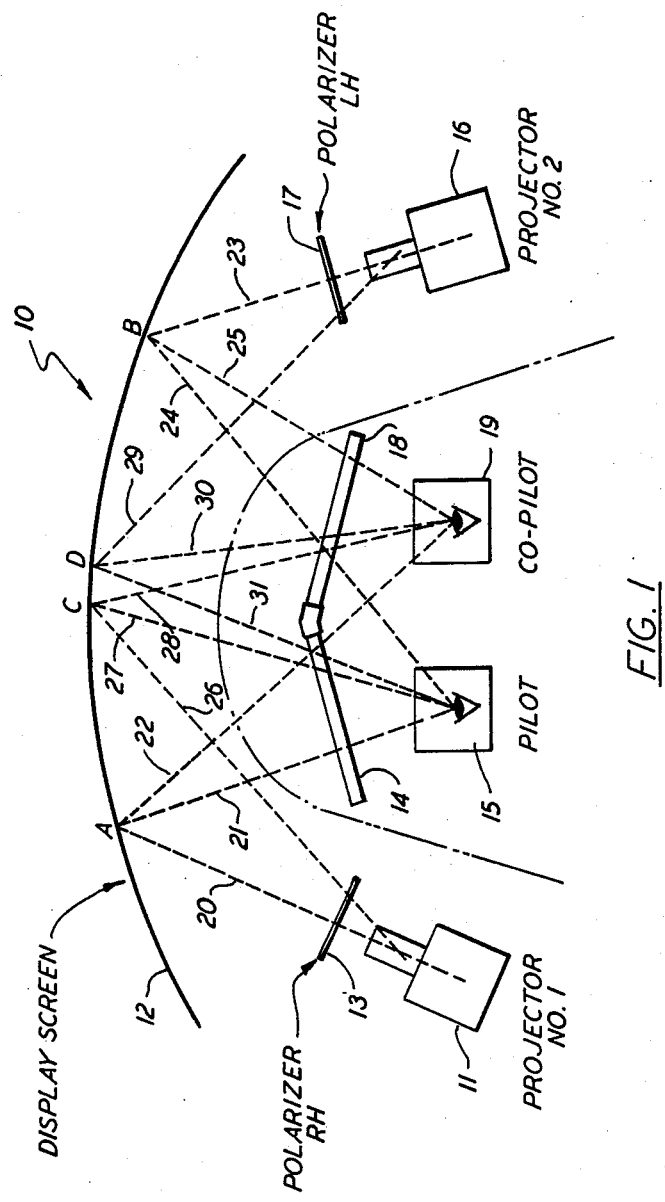
FIG. 1 is a plan view of an aircraft simulator to illustrate diagramatically the principal component parts of the present invention.

Referring now to FIG. 1 of the drawings, the numeral 10 identifies the overall arrangement of component parts to complete a simulator of an aircraft as an illustration of one type of vehicle with which the visual system of the present invention is adapted for use. The numeral 11 identifies one of a first plurality of projectors to present to a screen 12 a predetermined image suitable for the vehicle simulator 10.

A polarizer device 13 is positioned to polarize the beam of light coming from the projectors 11 in a right-hand or clockwise manner.

The numeral 14 identifies an analyzer filter device that can also serve as the wind shield for a pilot in a position 15 of a flight simulator 10.

The numeral 16 identifies one of a second plurality of projectors that project a group of images onto the screen 12. A polarizer device 17 polarizes the light images from the projectors 16 in a left-hand or counter-clockwise direction, and an analyzer filter device 18 serves also as a windshield for a co-pilot in a position 19.

In carrying out the present invention, it is particularly important to note that the polarizer devices 13 and 17 are for circularly polarizing the light images passing therethrough and not for any of the other types of polarization, such as linear polarizing. A reason for this is that the polarizing plane of linearly polarized light becomes variably rotated on reflection from a curved screen. This does not happen on a flat screen.

To explain this further, refer to FIG. 2 of the drawings.

In FIG. 2, a light beam is illustrated as being polarized in a circular manner to the right or clockwise direction. As contrasted with that illustrated in FIG. 3 of the drawings, the light there is illustrated as being circular to the left, or counter-clockwise.

FIG. 4 of the drawings is an illustration of a linear polarized beam that is polarized in a vertical plane, and FIG. 5 is an illustration of a linear polarized light beam that is polarized in a horizontal plane. It is particularly important in connection with an understanding of this invention to understand that these linearly polarized beams are NOT operable for the present invention.

Returning to a discussion of FIG. 1, the display screen 12 must be of a particular type to be operable in connection with the present invention. Simply stated, the screen 12 must have a surface that will preserve perfectly a circular polarized light beam on reflection. It is recognized that the direction of a circular polarized beam will change its direction of polarization on reflection, i.e., a right-hand circular polarized beam on reflection becomes a left hand circular polarized beam.

While there may be any number of ways of constructing a suitable display screen surface for a screen 12, it has been found that the screen described and claimed in the U.S. Pat. No. 4,354,738 uniquely performs this function substantially perfectly. That screen is made up of a plurality of very small particles of a flat metallic, highly reflective, material, such as a liquid metallic silver mixture with a lacquer binder component, a mixing color agent component, and a flattening agent component.

While a particular use situation may dictate the types of projectors for the projectors 11 and 16 in FIG. 1, it has been found that for a simulator installation, model PJ5155 made by the General Electric Company is particularly appropriate. For both the right and left-hand polarizers 13 and 17, the Polaroid Corporation model HNCP37 neutral-color circular polarizer is entirely satisfactory.

In operation, referring again to FIG. 1 of the drawings, an image projected on the screen 12 at a point A by a projector 11 along a line 20 is visible to both the pilot and co-pilot in the positions 15 and 19, respectively, along the lines 21 and 22. Similarly, an image projected on the screen 12 at a point B by the projector 16 along a line 23 is visible to both the pilot and the co-pilot in the positions 15 and 19, respectively, along the lines 24 and 25. This means that anyone viewing point A through the analyzer filter device 14 may see point A, and in like manner, anyone viewing point B through the analyzer 18 would find that point B is entirely visible.

In contrast, an image projected on the screen 12 at a point C by the projector 11 along a line 26 is entirely visible to the pilot in the position 15 viewing point C along a line 27 which is through the analyzer filter device 14. However, the co-pilot in the position 19 viewing point C along a line 28 through the analyzer filter device 18 would not see the point C.

Similarly, an image at point D that is projected on the screen 12 by the projector 16 is readily visible to a co-pilot in his position 19 viewing along a line 30, but this point D would not be visible to a pilot in his position 15 viewing along a line 31 through the analyzer filter device 14.

An advantage of the present invention is realized when an object is projected toward the center of the screen more directly in front of the simulator 10. Such an object, for example an image of a runway, as projected at the point C by the projector 11 and is projected also by the projector 16, but is displaced to the point D. However, the pilot at his position 15 cannot see the runway D, only the runway C, and in like manner, a co-pilot at his position 19 cannot see the runway C, but only the runway D.

In view of the detailed description herein above, various modifications of the preferred form of the invention will occur to one skilled in this art. Accordingly, the description and modifications are to be considered as illustrative only, the true spirit and scope of the invention being that as defined by the claims appended hereto.

We claim:

1. A visual system, comprising:
   projector means for projecting a predetermined image for viewing from a predetermined viewing position,
   means to polarize said image in two different preselected circular directions forming two different image portions,
   screen means positioned so that each point thereon is substantially equidistant from said viewing position and to reflect said predetermined image while preserving the circular nature of the polarized image portion, and
   analyzer means positioned between said screen means and viewing position to separate said polarized images.

2. A visual system as defined in claim 1 wherein said projector means includes at least two projectors for projecting a predetermined image for viewing from at least two separate positions, and said means to polarize includes means to polarize a predetermined portion of said image in a preselected circular direction and to polarize a different portion of said image in a circular direction opposite from said preselected direction.

3. A visual system as defined in claim 2 wherein said analyzer means includes a first analyzer to filter out all of said image except that which is polarized in said preselected circular direction and a second analyzer positioned to filter out all of said image except that which is polarized in said circular direction opposite from said preselected direction.

4. A visual system as defined in claim 3 wherein said first analyzer is positioned to view said predetermined portion of the polarized image from said predetermined viewing position and said second analyzer is positioned to view said different portion of said image, said first analyzer being formed to pass light images that are opposite of said preselected circular direction, and said second analyzer being formed to pass light images that are polarized in said preselected circular direction.

5. A visual system, comprising:
   a vehicle simulator having two positions for two trainees to view a scene through separate windows,
   a curved display screen positioned before the windows, said curved display screen having a surface made of very small particles of a flat metalic, highly-reflective material so as to preserve the polarized nature of light on reflection, first projector means including a plurality of projectors for projecting a predetermined image for viewing from a first position, second projector means including a plurality of projectors for projecting a scene for viewing from a second position, first means to polarize said predetermined image in a preselected circular direction for viewing from said first position, second means to polarize said scene from said second projector means in a direction opposite from said preselected direction for viewing from said second position, first analyzer means positioned on and supported by said window viewed from said position the nature of which is to pass light readily that is circularly polarized in a direction opposite from said first means to polarize, second analyzer means positioned on and supported by said second window for viewing images from said second position the nature of which is to pass light readily that is circularly polarized in a direction opposite from said second means to polarize.

* * * * *